(12) United States Patent
Janisch

(10) Patent No.: US 6,750,411 B2
(45) Date of Patent: Jun. 15, 2004

(54) ADJUSTABLE EMERGENCY STOP SWITCH

(75) Inventor: Darrel Janisch, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/289,742

(22) Filed: Nov. 6, 2002

(65) Prior Publication Data

US 2004/0084292 A1 May 6, 2004

(51) Int. Cl.[7] ................................................ H01H 9/06
(52) U.S. Cl. ............................... 200/61.85; 200/61.27; 200/293
(58) Field of Search .......................... 200/61.85, 61.86, 200/61.88, 61.89, 61.91, 17 R, 18, 61.27, 61.3, 61.54, 61.57, 52 R, 293, 294, 296

(56) References Cited

U.S. PATENT DOCUMENTS

| | | | | |
|---|---|---|---|---|
| 4,458,115 A | * | 7/1984 | Peterson | 200/61.85 |
| 4,497,988 A | * | 2/1985 | Brown | 200/61.85 |
| 4,641,723 A | * | 2/1987 | Takanashi et al. | 180/315 |
| 4,710,599 A | * | 12/1987 | Motodate et al. | 200/61.85 |
| 4,847,454 A | * | 7/1989 | Hiruma | 200/61.85 |
| 5,257,673 A | * | 11/1993 | Sato et al. | 180/271 |
| 5,603,400 A | * | 2/1997 | Goto et al. | 200/302.3 |
| 6,225,584 B1 | * | 5/2001 | Ase et al. | 200/61.54 |
| 6,227,068 B1 | * | 5/2001 | Masui et al. | 74/473.3 |
| 6,538,221 B1 | * | 3/2003 | Nishimoto et al. | 200/334 |

* cited by examiner

*Primary Examiner*—Lincoln Donovan
*Assistant Examiner*—K. Lee
(74) *Attorney, Agent, or Firm*—Merchant & Gould, P.C.

(57) ABSTRACT

The present invention relates to an adjustable emergency stop switch for a snowmobile, ATV, motorcycle, personal watercraft, or other recreational vehicle that requires an emergency stop switch and typically includes handlebars. The emergency stop switch of the present invention includes a switch housing that is mounted to and adjustable relative to a module that includes at least one other vehicle control. The module is typically rotatably adjustable relative to a handlebar of the vehicle. The adjustability of the emergency stop switch housing relative to the module enables the emergency stop switch to be oriented into a desired position regardless of the rotated position of the module.

18 Claims, 3 Drawing Sheets

US 6,750,411 B2

ADJUSTABLE EMERGENCY STOP SWITCH

BACKGROUND OF THE INVENTION

1. Field of the Invention

The present invention relates to an emergency stop switch for a vehicle, and more specifically relates to an adjustable emergency stop switch for a snowmobile or multi-purpose vehicle that is adjustable to maintain an upright position at all times.

2. Related Art

Emergency stop switches are a mandatory safety feature for snowmobiles, multi-purpose vehicles (such as ATV's), motorcycles, personal watercraft, and other recreational vehicles. Typically, the emergency stop switch is positioned close to the throttle handle of a vehicle so that the emergency switch is easily accessible by an operator of the vehicle, particularly in a panic or emergency situation when the vehicle engine must be stopped. In some cases, it is important to maintain a consistent and predictable position for the emergency stop switch so that the switch is easily activated in an emergency situation. As such, it is typically desirable to keep the emergency stop switch oriented in a generally vertical position with a shape and operation so that the operator of the vehicle can turn off the vehicle engine quickly with little forethought. In other cases, it is advantageous to be able to adjust the emergency kill switch into a second position so that an operator of the vehicle does not inadvertently activate the switch.

Known emergency stop switches are typically mounted either as a separate module adjacent the throttle handle or other handle bar control, or mounted on the same module with the throttle handle or other control. In some applications the stop switch typically will be mounted on a right handlebar, while in others it typically will be mounted on a left handlebar. When mounted separately from the throttle, the emergency stop switch is independently adjustable about the handlebar of the vehicle to orient the switch into a desired position. However, when the emergency stop switch is mounted on the same module as the throttle handle, and the module is rotatably adjustable to move the throttle handle into a preferred position for an operator of the vehicle, the emergency stop switch may end up in an undesirable position for certain riding positions, for example where the operator is not seated.

SUMMARY OF THE INVENTION

The present invention relates to an adjustable emergency stop switch for a snowmobile, ATV, motorcycle, personal watercraft, or other recreational vehicle with handlebars. The emergency stop switch includes a switch housing that is mounted to and separately adjustable relative to a module that include at least one other vehicle control. For example the emergency stop switch may be mounted to a module that includes a throttle handle, light switch, starter switch, thumb warmer or hand warmer switch, or a combination of these controls. Typically, the module to which the emergency stop switch is mounted is rotatably adjustable about a handlebar of the vehicle, and the emergency stop switch is separately adjustable from the module so as to be adjustable into a desired position.

DETAILED DESCRIPTION OF THE PREFERRED EMBODIMENT

The present invention relates to an adjustable emergency stop switch for a snowmobile, ATV, motorcycle, personal watercraft, or other recreational vehicle that requires an emergency stop switch and typically includes handlebars. The emergency stop switch of the present invention includes a switch housing that is mounted to and adjustable relative to a module that includes at least one other vehicle control. The module is typically rotatably adjustable relative to a handlebar of the vehicle. The adjustability of the emergency stop switch housing relative to the module enables the emergency stop switch to be oriented into a desired position regardless of the rotated position of the module.

Figure 1:
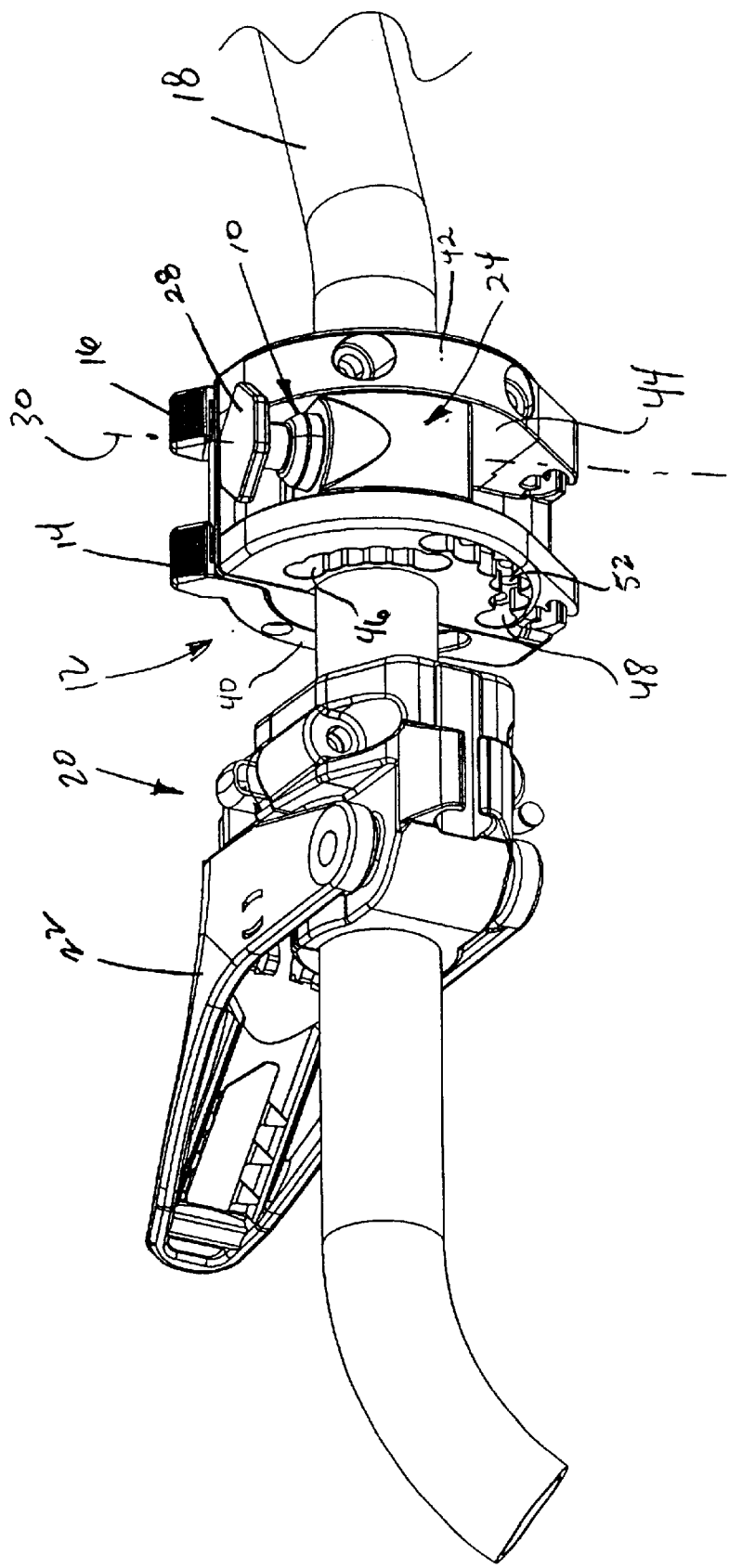
FIG. 1 is a perspective view of one example of an emergency stop switch assembly of the present invention mounted to a control module on a vehicle handlebar that includes two additional vehicle controls and is positioned adjacent a throttle handle module.
Figure 3:
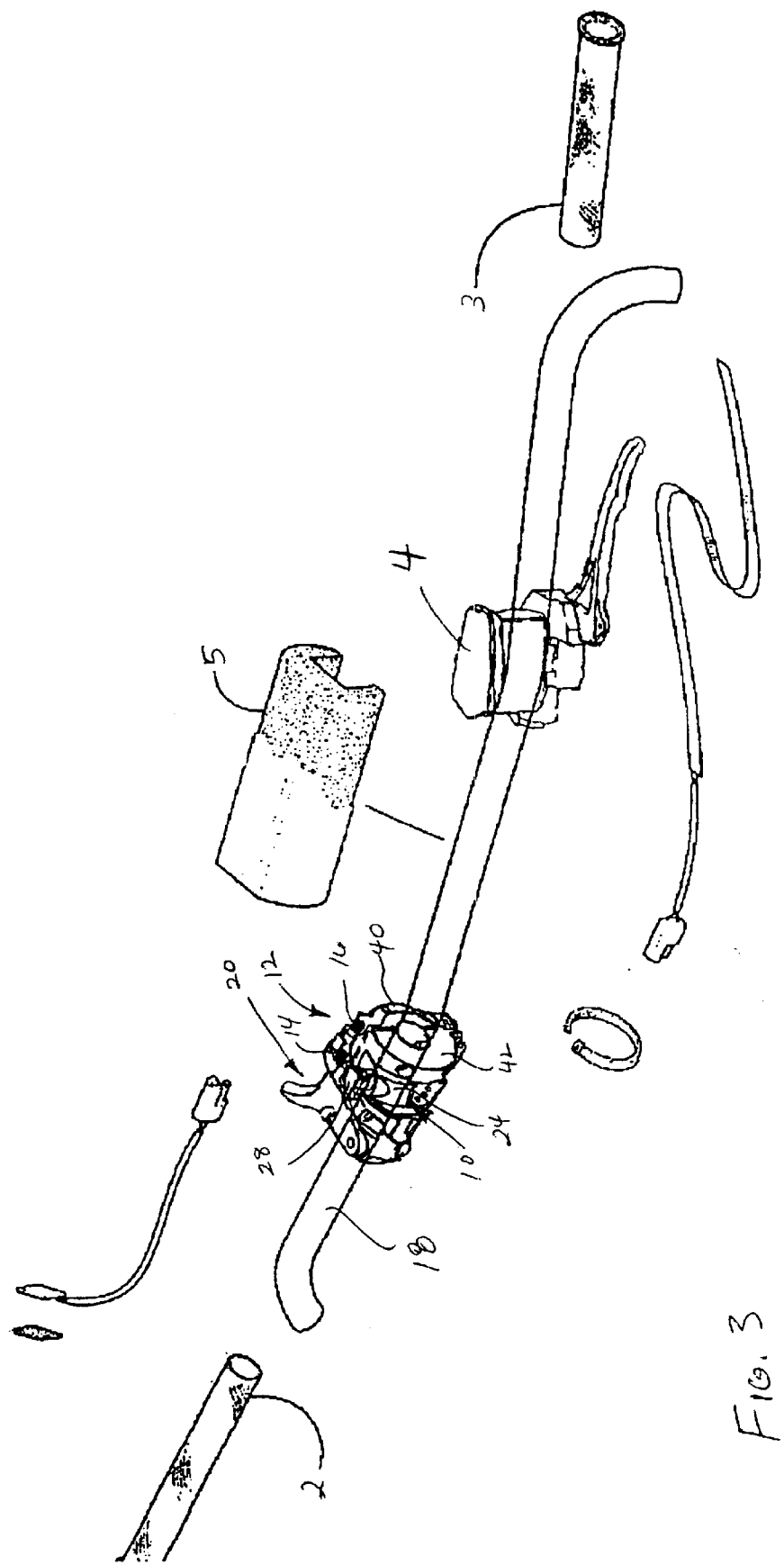
FIG. 3 is another exploded perspective view of the modules shown in FIG. 1 showing one example of the relative position of the modules relative to the handlebar and other vehicle features typically mounted to the handlebar.

FIG. 1 illustrates a perspective view of one example of an adjustable emergency stop switch assembly 10 mounted to a first module 12 that includes two separate vehicle controls 14, 16. In this embodiment, the first module is mounted to a handlebar 18 of the vehicle adjacent a second module 20 that includes a throttle handle 22. Typically, the first and second modules 12, 20 are capable of being rotatably adjusted on handlebar 18 into a position that is most convenient for an operator of the vehicle to operate controls 14, 16 and throttle handle 22. FIG. 3 illustrates the one example where first and second modules 12, 20 may be positioned on handlebar 18 relative to other controls (e.g., brake module 4) and features (e.g., handlebar grips 2, 3 and steering column cover 5) mounted to handlebar 18.

Figure 2:
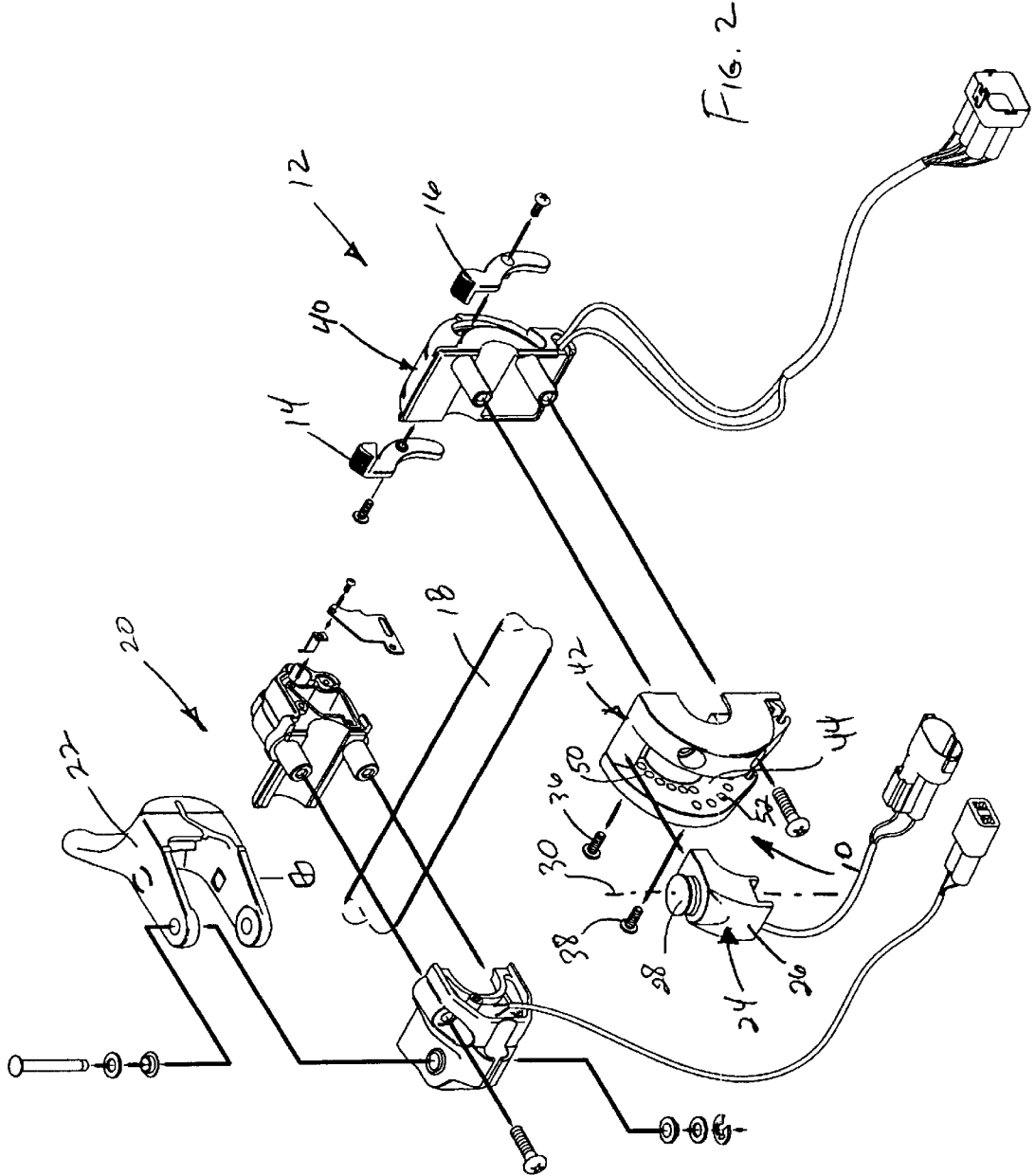
FIG. 2 is an exploded perspective view of the modules shown in FIG. 1.

FIGS. 1–3 illustrate the various features of emergency stop switch assembly 10. Assembly 10 includes a switch housing 24 having a base member 26, a switch 28 that moves in the direction of a switch axis 30 extending through housing 24, and bores (not shown) that are configured to receive adjustment fasteners 36, 38 (see FIG. 2).

First module 12 may include a first portion 40 configured for mounting first and second controls 14, 16, and a second portion 42 having a track 44 for adjustably mounting assembly 10. Second portion 42 also includes first and second adjustment grooves 46, 48 (see FIG. 1), which include a series of fastener bores 50, 52 (see FIG. 2) for receiving adjustment fasteners 36, 38. In order to adjust a position of switch housing 24 relative to second portion 42, adjustment fasteners 36, 38 are removed from the bores in the housing 24 and the bores and 50, 52, housing 24 is adjusted relative to track 44, and the adjustment fasteners reinserted into bores in the housing 24 through different bores 50, 52. Thus, regardless of the position in which module 12 has been set, the orientation of switch housing 24 may be separately adjusted to orient switch 28 in a desired position.

Most features of assembly 10 and first and second portions 40, 42 may be altered to account for various amounts of adjustability of switch housing 24, first module 12, and controls 14, 16. For example, track 44 shown in FIGS. 1 and 2 permits switch housing 24 to be adjusted through about a 90° angle. In other embodiments, the track may be configured to include a larger or smaller angle of adjustability (e.g., 45° or 135° angle) in which switch housing 24 can be moved. In another example, there may be one, three, or more controls mounted to first module 12 (rather than two controls shown in FIGS. 1 and 2) in addition to assembly 10. In another example, there may be only one adjustment bore, or three or more adjustment bores in housing 24 for receiving adjustment fasteners to provide different adjustment capabilities.

In another embodiment (not shown), the emergency stop switch assembly 10 may be mounted to second module 20. In such an embodiment, second module 10 would include the same or similar features as those shown in FIGS. 1–3 for first module 12 (e.g., track 44), and switch housing 24 of assembly 10 would be separately adjustable to adjust the orientation of switch 28 relative to second module 20.

In the embodiment of FIGS. 1–3, controls 14 and 16 represent thumb warmer and hand warmer controls for a snowmobile. However, in other embodiments, first module 12 may be configured to mount different controls for a different vehicle, such as, for example, a headlight switch for an ATV, a start switch for a personal watercraft, or a blinker switch for a motorcycle.

In a yet further embodiment, assembly 10 may be part of a module that is not adjustable relative to handlebar 18 and does not mount additional controls. In this embodiment, assembly 10 would be capable of providing independent adjustability of switch 28 relative to the module because the module itself is not adjustable relative to handlebar 18.

The adjustability of the emergency stop switch assembly of the present invention may be particularly useful for positioning the switch away from an operator of the vehicle so that the switch is not inadvertently activated during certain driving conditions. For example, it may be desirable to move the switch on a snowmobile into such a removed position when operating the snowmobile in extreme conditions when the operator is frequently shifting driving positions. In other situations, such as when a youth or child is operating the vehicle, it is desirable to ensure that the switch is always in a vertically-oriented position, regardless of the adjusted position of other controls on a module to which the emergency stop switch is mounted, so that the switch is always in an easily accessible, predictable location.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An emergency stop switch assembly configured for operation with a control module of a vehicle, the control module configured to mount a control member separate from the emergency stop switch assembly, the assembly comprising:
   a switch housing carried by and adjustably mounted to the control module; and
   a stop switch mounted in the switch housing and movable between first and second positions in the switch housing;
   whereby adjustment of the switch housing adjusts a position of the stop switch relative to the control module.

2. The assembly of claim 1, wherein the control module is adjustably mounted to the vehicle.

3. A control module configured for mounting to a handlebar of a vehicle, comprising:
   a control member mounted to the module and configured to control an operation of the vehicle; and
   an emergency stop switch carried by and adjustably mounted to the control module so that a mounted position of the emergency stop switch is adjustable relative to the control module separate from a switching function of the emergency stop switch;
   whereby the emergency stop switch is separate from the control member.

4. The control module of claim 3 further comprising a first portion and a second portion, the first portion being configured to mount the control member and the second portion being configured to mount the emergency stop switch.

5. The control module of claim 3 wherein the emergency stop switch comprises a switch housing and a switch mounted in the switch housing.

6. The control module of claim 5, wherein the control module comprises a track portion configured to receive the switch housing, the track portion defining a range of positions in which the emergency stop switch is oriented relative to the control module.

7. The control module of claim 5 wherein the control module comprises at least two adjustment members, each adjustment member being configured to retain the switch housing in a separate predetermined adjusted position.

8. The control module of claim 3, wherein the control module is configured for adjustable mounting to the handlebar of the vehicle.

9. A method of adjustably mounting an emergency stop switch to a handlebar of a vehicle, comprising the steps of:
   mounting a control module to the handlebar;
   mounting a control member to the control module; and
   adjustably mounting an emergency stop switch to the control module such that the emergency stop switch is carried by the control module;
   whereby a mounted orientation of the emergency stop switch is adjustable relative to the control module separate from a mounted orientation of the control member.

10. The method of claim 9, wherein the control module is configured to be adjustably mounted to the handlebar so as to be rotatably adjustable.

11. The method of claim 9, wherein the emergency stop switch comprises a switch housing and a switch mounted to the housing, the switch housing being adjustably mounted to the control module to adjust an orientation of the switch relative to the control module.

12. The method of claim 11 wherein the control module comprises a track portion configured for receiving the switch housing, the track portion defining a range of adjusted positions of the switch housing.

13. The method of claim 9, wherein the control module is adjustably mounted to the handlebar.

14. A snowmobile, comprising:
   an engine;
   a handlebar; and
   a control module mounted to the handlebar, comprising:
      a control member mounted to the module and configured to control an operation of the snowmobile; and
      an emergency stop switch carried by and adjustably mounted to the module so that a mounted position of the emergency stop switch is adjustable relative to the module separate from a switching function of the emergency stop switch.

15. An all terrain vehicle, comprising:
   an engine;

a handlebar; and a control module mounted to the handlebar, comprising:
    a control member mounted to the control module and configured to control an operation of the vehicle; and
    an emergency stop switch carried by and adjustably mounted to the control module so that a mounted position of the emergency stop switch is adjustable relative to the control module separate from a switching function of the emergency stop switch.

16. A personal watercraft, comprising:

an engine;

a handlebar; and a control module mounted to the handlebar, comprising:
    a control member mounted to the control module and configured to control an operation of the watercraft; and
    an emergency stop switch carried by and adjustably mounted to the control module so that a mounted position of the emergency stop switch is adjustable relative to the control module separate from a switching function of the emergency stop switch.

17. A motorcycle, comprising:

an engine;

a handlebar; and a control module mounted to the handlebar, comprising:
    a control member mounted to the control module and configured to control an operation of the motorcycle; and
    an emergency stop switch carried by and adjustably mounted to the control module so that a mounted position of the emergency stop switch is adjustable relative to the control module separate from a switching function of the emergency stop switch.

18. A control module configured for mounting to a handlebar of a vehicle, comprising:
    a control member mounted to the module and configured to control an operation of the vehicle;
    an emergency stop switch including a switch housing and a switch mounted in the switch housing, the switch housing being adjustably mounted to the control module so that a position of the emergency stop switch is separately adjustable relative to the control module; and
    a track portion configured to receive the switch housing, the track portion defining a range of positions in which the emergency stop switch is oriented relative to the control module;
    whereby the emergency stop switch is separate from the control member.

* * * * *